US006114028A

United States Patent [19]

Muchin et al.

[11] Patent Number: 6,114,028

[45] Date of Patent: Sep. 5, 2000

[54] COOKING VESSEL WITH PATTERNED RELEASE FINISH HAVING IMPROVED HEAT TRANSFER

[75] Inventors: Jay Z. Muchin, Manitowoc, Wis.; Kenneth Batzar, Cherry Hill, N.J.; Thomas J. Leck, Hockessin, Del.

[73] Assignee: E. I. du Pont de Nemours and Company, Wilmington, Del.

[21] Appl. No.: 09/227,470

[22] Filed: Jan. 8, 1999

Related U.S. Application Data

[63] Continuation-in-part of application No. 09/144,766, Sep. 1, 1998

[60] Provisional application No. 60/058,148, Sep. 8, 1997.

[51] Int. Cl.[7] .............................. B32B 5/14; B32B 27/16; B32B 27/20; B32B 27/30

[52] U.S. Cl. .......................... 428/323; 428/335; 428/421; 428/422

[58] Field of Search .................................... 428/323, 334, 428/335, 421, 422, 441, 442, 426, 457, 461, 463

[56] References Cited

U.S. PATENT DOCUMENTS 3,087,827 4/1963 Klenke et al. .......................... 106/291
3,087,828 4/1963 Linton .................................... 106/291
3,087,829 4/1963 Linton .................................... 106/291
5,250,356 10/1993 Batzar .................................... 428/421

FOREIGN PATENT DOCUMENTS 1131038 10/1968 United Kingdom .

*Primary Examiner*—Vivian Chen
*Attorney, Agent, or Firm*—Thomas W. Steinberg

[57] ABSTRACT

A coating containing flakes made of a thermally conductive material is disposed on the inner surface of the bottom of a cooking vessel. A first portion of the flakes is oriented in the plane of the inner surface and a second portion of the flakes is oriented in the thickness direction of the coating to form a heat conductive pattern. The flakes include flakes having a longest dimension that is greater than the thickness of the coating, thus improving heat transfer from the bottom of the cooking vessel to the upper surface of the coating. The heat conductive pattern includes a plurality of segments that extend outwardly from a center region of the inner surface toward an outer peripheral region. The outwardly extending segments improve heat transfer from the center region to the outer peripheral region, especially when the cooking vessel is heated by a heating element having a diameter smaller than the diameter of the cooking vessel bottom. The outwardly extending segments also improve the uniformity of the heat distribution about the upper surface of the coating, thus ensuring even heating of the cooking vessel's contents.

16 Claims, 5 Drawing Sheets

COOKING VESSEL WITH PATTERNED RELEASE FINISH HAVING IMPROVED HEAT TRANSFER

REFERENCE TO RELATED APPLICATIONS

This application is a continuation-in-part of application U.S. Ser. No. 09/144,766, filed Sep. 1, 1998, which claims the benefit of priority of application U.S. Ser. No. 60/058,148, filed Sep. 8, 1997. This application is related to application U.S. Ser. No. 09/144,775 filed Sep. 1, 1998 which is incorporated herein by reference.

FIELD OF THE INVENTION

This invention relates generally to cooking vessels having a patterned release coating and, in particular, to cooking vessels with a release coating that includes a thermally conductive material arranged in a heat conductive pattern that enhances heat transfer to and evenly distributes heat about the cooking surface. The heat conductive pattern may also be visible, thus providing decorative appeal.

BACKGROUND OF THE INVENTION

It has long been desirable to produce coated cookware which has an inner cooking surface having good release properties. It is also desirable that heat can be rapidly transferred to such cooking surfaces without the need to subject the outer bottom surface of the cooking vessel to excessive heat. Further, it is desirable to uniformly distribute the heat about the entire cooking surface such that food placed on the cooking surface may be evenly cooked. Even heat distribution is particularly problematic in situations in which the cookware is placed on a heating element that has a smaller diameter than the diameter of the cookware's bottom. In such a case, the central region of the cooking surface heats more rapidly and tends to remain hotter than the outer peripheral regions and results in uneven heating of the cookware's contents.

It also has long been desirable to produce coated cookware which has decorative appeal. One attempt to produce patterned cookware which exhibits an illusion of optical depth is described in GB 1,131,038 (Tefal). The specification discloses a process for producing a pattern of flaked magnetic particles in a polytetrafluoroethylene (PTFE) matrix as a coating on a substrate. The process is carried out by mixing the flakes with an aqueous dispersion of PTFE and coating the dispersion onto the substrate. After the coating step, a magnet is placed on the underside of the substrate (base), and the magnetic field from the magnet causes the flakes to be attracted toward the magnet. As shown in FIG. 3 of the '038 patent, this movement includes the vertical and near vertical orientation of the flakes within the coating thickness and the flakes are entirely contained within the coating, which means that their largest dimension is smaller than the thickness of the coating. This requires either thick coatings or very small flakes (small largest dimension). The problem with small flakes, however, is that they tend not to form a distinguishable pattern in the coating. Consequently, thick PTFE coatings are necessary to produce a visible pattern. Even then, the vertical orientation of the flakes by the magnetic lines of force inevitably causes flakes near the top surface of the coating to protrude from the surface, causing roughness of the baked coating, which is undesirable for a release coating. The '038 patent also discloses that the base has cavities in it, i.e., it has a rough surface, which enables the flakes to be immobilized during the baking of the coating. Among the problems with the magnetic patterning of the release coating by the process of the '038 patent is the need for an excessively thick PTFE coating, which nevertheless fails to completely contain all of the flakes within its thickness and the need for a roughened substrate for adhering the coating to the substrate and immobilizing the flakes during sintering.

Another problem with the pattern formed by the process of the '038 patent is that the pattern is "fuzzy", i.e., lacks clarity. When the coated substrate is placed directly on the magnet of FIG. 1 of the '038 patent, the annular pole piece of the magnet is reproduced in the coating as a toroid ring, deviating from the shape of the circular ring of the pole piece serving as the pattern. When a shaped plate is laid across the top of the magnet, the resultant imprint of the shaped plate is especially fuzzy where the magnetic force is directed through the bulk area of the shaped plate as shown in FIG. 2 of the '038 patent. The "fuzzy" image is a manifestation of the of the '038 patent method producing unwanted field lines (magnetic background effects); such method also produces a rough decorative surface. If a stronger magnet is used in the method of the '038 patent, to try to eliminate the fuzziness of the image, i.e. sharpen the image, another unwanted background effect occurs, namely reproduction of the shape of the magnet in the pattern in the coating.

In addition to design, cookware often includes liquid level markings on the inside sidewalls of pots and pans or the like. Traditionally, such markings have been achieved by embossing the metal base prior to overcoating with nonstick finish. However, the depressions protrusions formed by embossing can interfere with the release properties of the surface, causing a buildup of food deposits and becoming a source of corrosion.

SUMMARY OF THE INVENTION

The present invention provides cookware with a release coating that includes a heat conductive pattern arranged such that heat transfer to the cooking surface is enhanced as well as heat distribution about the cooking surface. In one embodiment of the invention, a cooking vessel includes a bottom having an inner surface, the inner surface having a central region and an outer peripheral region. A coating, which is disposed on the bottom of the cooking vessel, includes flakes that are made of a thermally conductive material and that have a longest dimension that is greater than the thickness of the coating. A first portion of the flakes is oriented substantially in the plane of the inner surface and a second portion of the flakes is oriented substantially in the thickness direction of the coating to form a heat conductive pattern. The heat conductive pattern extends outwardly from the central region toward the outer peripheral region.

The thickness direction orientation of the second portion of the flakes improves the heat transfer between the cookware bottom and the upper surface of the coating. Because the flakes have a longest dimension that is greater than the thickness of the coating which contains the flakes, the flakes extend through the coating to provide optimum heat transfer from the bottom to the coating upper surface.

The arrangement of the heat conductive pattern such that it extends outwardly from the central region of the inner surface toward the outer peripheral region facilitates more rapid transfer of heat from the central region to the outer areas and assists in maintaining the entire cooking surface at a uniform temperature. This aspect is particularly advantageous when the bottom of the cooking vessel is heated by a heating element (e.g., a stovetop burner) that has a diameter smaller than the diameter of the vessel's bottom.

In a preferred embodiment of the invention, the thermally conductive material is magnetizable such that the second portion of the flakes may be magnetically reoriented in the thickness direction of the coating. That is, when the coating composition is applied in liquid form to the inner surface of the cooking vessel bottom, the flakes orient themselves generally parallel to the plane of the inner surface of the bottom. A localized magnetic field may then be applied to reorient a portion of the flakes from the original planar orientation. This reorientation will vary from perpendicular to the original planar orientation, i.e., perpendicular to the bottom's inner surface, to less than perpendicular to the original plane.

In another embodiment of the invention, the planar oriented flakes reflect incident light back to the viewer, while the reoriented flakes do not, thus causing the heat conductive pattern to be visible to a viewer and enhancing the aesthetic appeal of the cooking vessel. Large flakes reflect more incident light and, thus, it is preferable to use flakes that have a longest dimension greater than the coating thickness. Small flakes are insufficiently reflective to give a distinct difference in appearance between the area of reoriented flakes and planar disposed flakes, or, in other words, to give a distinct pattern in the coating.

Because of the long dimension of the flakes being greater than the coating thickness, the reoriented flakes may protrude form the surface of the coating, while the flakes which lie in the plane of the coating, i.e., not tilted, will generally not protrude from the surface of the coating. Even though some of the reoriented flakes protrude from the surface of the coating, the protruded portions of such flakes are coated with the composition of the coating to form "mounds" of coating encasing the protruding portions of the flakes. The profile of these mounds, tapering into the flat surface of the coating, enable the coating (after baking) to serve as a release coating. By running one's finger over the surface of the baked coating, one can feel that the overall surface of the patterned release coating is smooth, and that the area of the pattern having the reoriented flakes is slightly less smooth than the area that contains the planar-oriented flakes, but nevertheless serves as a release coating, e.g., releasing food cooked thereon.

In one embodiment of the invention, the inner surface of the cooking vessel bottom is smooth and the coating is adhered to the inner surface through a primer layer on the inner surface. In a preferred embodiment, the inner surface smoothness is characterized by an average surface roughness of less than 1.5 micrometers. In another preferred embodiment, the coating containing the flakes is in two parts, a midcoat layer and a topcoat layer. The flakes are in the midcoat layer and the topcoat can either ensure that no flakes protrude from the surface of the overall coating or can smooth out the mounds which encase flakes protruding from the midcoat layer, depending on the thickness of the topcoat. The thickness of the midcoat layer and preferably the combined thickness of the midcoat and topcoat layers is less than the length of the long dimension flakes, in which case, while smoothing out the surface of the midcoat, the topcoat will telegraph the tops of the underlying mounds through the flat surface of the topcoat. This smoothing out provided by the topcoat further improves the release character of the coating. If a roughened substrate is used, which does not require a primer layer, the midcoat described above will be the bottom layer or undercoat layer.

The coated substrate (e.g., cooking vessel bottom) of the present invention is preferably made by a process wherein with the application of an aqueous dispersion comprising fluoropolymer and the magnetizable flakes to the substrate, the resultant liquid coating is subjected to localized magnetic force to produce the heat conductive pattern desired. Preferably the aqueous dispersion is applied simultaneously to the substrate with the application of the magnetic force. Another departure from the process of British patent 1,131,038 is how the magnetic force is applied to the flakes, namely from a diffuse magnetic field rather than directly from the magnet itself. The magnet which is the source of the magnetic force is spaced from the substrate being coated. The magnetic force is communicated across the space between the magnet and the flakes in the coating from a diffuse magnetic field intervening between the magnet and the coating through a die of magnetizable material positioned between the diffuse magnetic field and the coating on the substrate. The diffuse magnetic field isolates the coating from direct exposure to the magnetic field of the magnet, eliminating unwanted background effects from the pattern, thereby improving pattern clarity. The magnetizable die has reduced "background effects" on the pattern, i.e., greater clarity, than when the coating is subject to direct exposure of the magnetic field of the magnet. By background effects is meant that the magnetic force operates on flakes lying outside the edges of the desired pattern causing such background flakes to move out of planar configuration. These background effects cause unwanted fuzziness or increased darkness of the pattern edges. Another unwanted background effect is reproduction of the shape of the magnet in the pattern formed in the coating. Thus, in accordance with the present invention, the shape of the pattern can both be sharp and independent of the shape of the magnet and the pattern can be in the form of lines rather than thick imprints of the source of the magnetic force as in the '038 patent. The magnetizable material can be considered the die for the pattern.

In one embodiment, the die is of sheet metal construction, e.g., forming an annulus, with the "knife" edge of the sheet metal shape (looking like a "cookie cutter") serving as the die. In another embodiment, the die is one or more pins. The edge of the sheet metal die forms a line pattern in the coating corresponding to the shape of the edge(s) of the die. Depending on the spacing of the pins from one another, the ends of the pins form a pattern of disconnected non-reflective or connected non-reflective (lines) regions. In still another embodiment, the die can be a plate having a configured edge and/or cut-outs. Instead of the plate being positioned "on-edge" to form the pattern in the coating, a lateral face of the plate is aligned with the bottom of the substrate to be coated, whereby the pattern present in the plate being subjected to the diffuse magnetic field is reproduced in the coating.

DETAILED DESCRIPTION

Reference will now be made in detail to the present invention as illustrated in the accompanying drawings.

Figure 1:
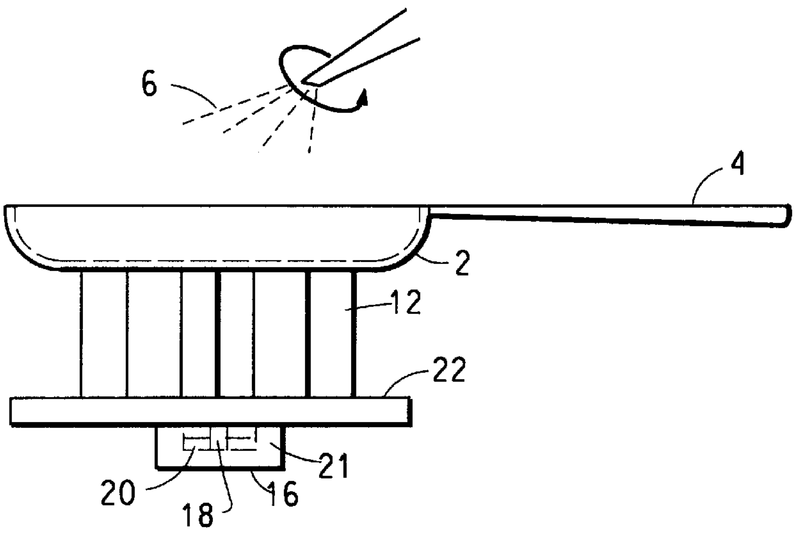
FIG. 1 shows in schematic side elevation an equipment arrangement for forming a magnetically induced pattern in a fluoropolymer release coating on one embodiment of substrate (a frying pan).
Figure 4:
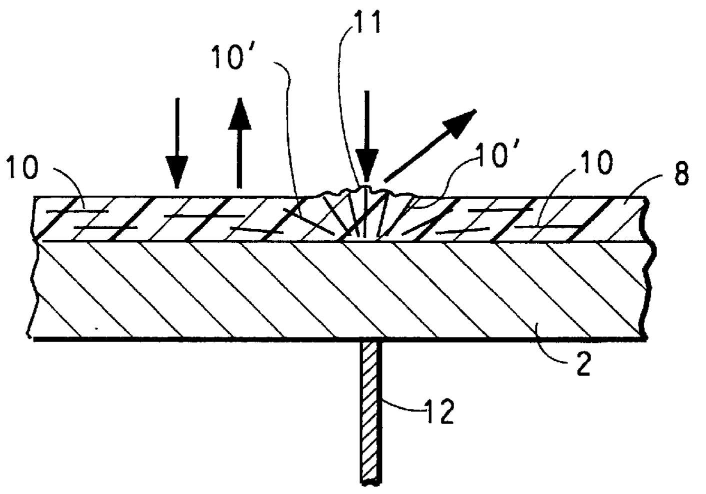
FIG. 4 shows in side elevation and enlarged cross-section the magnetically reoriented magnetizable flakes deflecting incident light on the release coating to produce the pattern shown in FIG. 3.

In FIG. 1 is shown the substrate to be coated and magnetically patterned in accordance with the present invention, the substrate being in the form of a frying pan 2 of non-magnetizable material such as aluminum, copper, stainless steel, glass or ceramic. The frying pan 2 is shown to have a handle 4. A liquid dispersion of a mixture of fluoropolymer resin and magnetizable flakes is applied as a spray 6 onto the interior surface of the frying pan 2 to form a release coating 8 thereon as best shown in FIG. 4. The flakes 10 in the sprayed composition tend to orient themselves generally parallel to the surface of the substrate as shown in FIG. 4, except in the region of magnetic force applied by magnetic die 12, which causes the flakes 10' in such region to reorient out of the plane of the substrate, i.e., such flakes form an angle with the plane of the substrate, whereby incident light on the release coating either is reflected at an angle away from the perpendicular path of the incident light as shown in FIG. 4 or is not reflected at all when the reoriented flakes are parallel to the incident light. The flakes 10' which are tilted to the perpendicular or near perpendicular protrude from the surface of layer 8, but the protruding portions of the flakes are encased in release composition of which layer 8 is composed to formed small mounds 11 of release coating protruding from the otherwise flat surface of the coating 8. Where the flakes 10 are parallel to the surface of the substrate, the incident light is reflected directly back to the viewer. The difference in reflection of the incident light gives the release coating a visible magnetically induced pattern in the shape of the magnetizable die.

Figure 2:
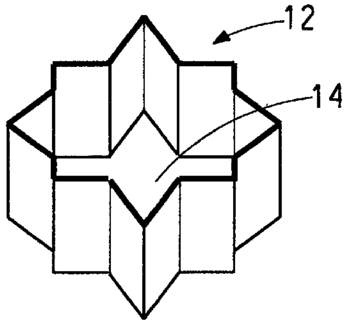
FIG. 2 is a perspective view of the magnetizable die used to form the pattern in FIG. 1.

The magnetic force is applied to form the pattern as further shown in FIG. 1. The magnetizable die 12 is made of sheet metal, e.g., 0.1 mm to 4 mm thick, and is in the form of a morningstar pattern as best shown in FIG. 2. The sheet metal forming the die 12 is at an angle with respect to the plane of the underside of the fry pan 2, so that the upper edge and not the face (side) of the sheet metal forms the pattern of localized magnetic force in the coating 8. The upper edge of the sheet metal can be as thin as a knife edge as well as thicker, e.g., up to the 4 mm thickness mentioned above. The die 12 in essence looks like a cookie cutter, with its size depending on the size of the pattern to be formed in the release coating. In order to stabilize the sheet metal walls forming the die, the interior space 14 of the die can be filled in by nonmagnetizable solid material such as wood (not shown).

Figure 3:
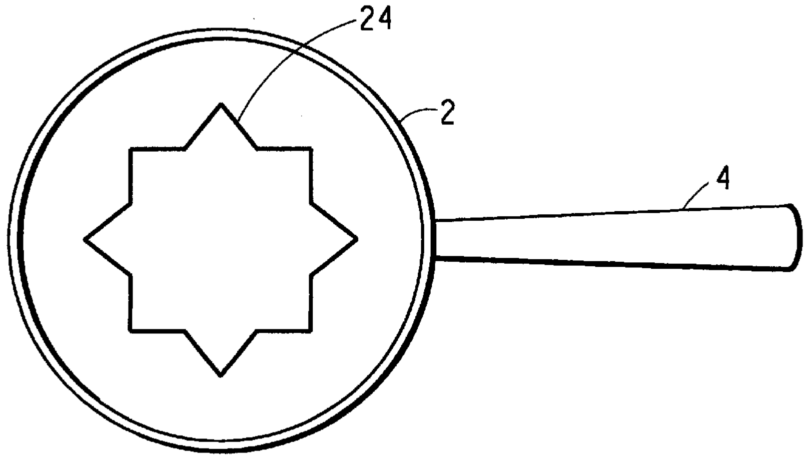
FIG. 3 shows a plan view of the substrate (frying pan) of FIG. 1 with the magnetically induced pattern visible in the release coating on the substrate.

The magnetizable die is not the source of the magnetic force. Instead, the source of the magnetic force is magnet 16 which can be a permanent magnet or as shown in FIG. 1 can be an electromagnet having a central pole 18 surrounded by electrical coil 20 and in turn by an annular pole 21. The magnet 16 generates the magnetic force necessary for the invention. The magnet 16 is spaced from the frying pan 2, and the magnetic force from the magnet is communicated to the release coating through the die 12. The spacing of the magnet from the underside of the substrate can be great enough that the coating on the substrate is not directly exposed to the magnetic force of the magnet or the magnetic force of the magnet 16 is diffused into a magnetizable metal plate 22 interposed between the magnet 16 and die 12. In either case, the die communicates the magnetic force from a diffuse magnetic field rather than the coating 8 being exposed directly to the magnetic field of the magnet. This enables the magnetically induced pattern in the release coating to be precisely controlled by the configuration of the magnetizable die 12, wherein the pattern closely conforms to the shape of the die facing the underside of the substrate. The morningstar pattern 24 as a hollow line pattern in the release coating resulting from the use of die 12 is shown in the base of the frying pan 2 in FIG. 3. This pattern is visible to the naked eye by virtue of light being reflected from the surface of the release coating, i.e. from the surface inside and outside the pattern.

Application of the magnetic force to the flakes in the release coating through the magnetizable die such as die 12 is effective to localize the reorientation effect on the flakes in the coating composition to provide the faithful reproduction of the die. The flakes are assumed to be reoriented, because in the absence of magnetic force, the flakes will be oriented substantially in the plane of the coating, so as to be light reflective. The magnetic force is not so strong that the die itself creates unwanted background fuzziness in the pattern, but is strong enough to produce the pattern in the coating. The diffuser plate 22 also enables the magnet to be any size, i.e. independent of the size of the pattern to be magnetically induced in the release coating, except that the area of the face of the magnet should be smaller, and totally contained within, the area of the diffuser plate, so that lines of force of the magnet cannot pass directly to the substrate being coated. Thus, one size magnet can be used to create a wide variety of pattern sizes and shapes, depending on the magnetizable die used.

A key to producing cookware which is decorative, has improved heat conduction characteristics and still retains its release properties is proper modulation of the magnetic force applied to the release coating by the die. Such modulation can be achieved by the height of the magnetic die and/or by use of the diffuser plate and can be facilitated by including additional spatial gaps of non-magnetizable material as needed to produce the pattern effects desired. Such a gap can be achieved by using nonmagnetizable spacing sheets (not shown) between the diffuser plate and the die or the magnetic die can be spaced from the underside of the frying pan instead of being in contact therewith as shown in FIG. 1. Another spatial gap can be achieved by the thickness of the cookware substrate thereby instituting a gap between the tips of the magnetizable die and the magnetizable flakes in the release coating. Any gap in addition to the thickness of the substrate (uncoated frying pan), spacing of the die from the substrate and/or the diffuser plate is selected to eliminate background effects of the magnetic field of the magnet, while allowing the magnetic force to penetrate the gap and via the magnetic die, to act on the release coating.

In the case of point and edge effects, field strength has been determined to drop by a factor of $1/d^7$ where d is the distance of the spatial gap between the tips of the magnetizable die and the magnetizable flakes. So even a small spatial gap will greatly affect the magnetic strength. By reducing the strength of the magnetic field and eliminating or decreasing certain lines of force, magnetic background effects are reduced. This results in a smooth decorative surface on the substrate.

While the magnetizable flakes still in the liquid state of the coating are mobile, it has been found that clarity of the pattern is improved when the coating is exposed to the magnetic force from the magnetizable die simultaneously with the step of applying the liquid coating composition to the substrate. To facilitate these steps being carried out simultaneously, the magnetic die is preferably positioned on the underside of the substrate to be coated with the release coating instead of on the coating side thereof.

The resultant liquid coating, containing the magnetically-induced pattern, is then dried and baked to sinter or otherwise fuse the fluoropolymer to form the release coating, by heating the coating typically to temperatures of 350° C. to 420° C., depending on the fluoropolymer resin used. The flakes in the release coating should be made of a heat conductive material that, while magnetizable, is unaffected by such heating. Examples of material from which the flakes can be made include such metals as iron and nickel and alloys containing these metals, with stainless steel being the preferred material. Metals are much more thermally conductive than the polymers in the release coating. For simplicity, the fluoropolymer resin/flake coating is referred to as a release coating both before and after the baking step, when in fact the baking step is necessary before the release (non-stick) characteristic is realized.

Figure 5:
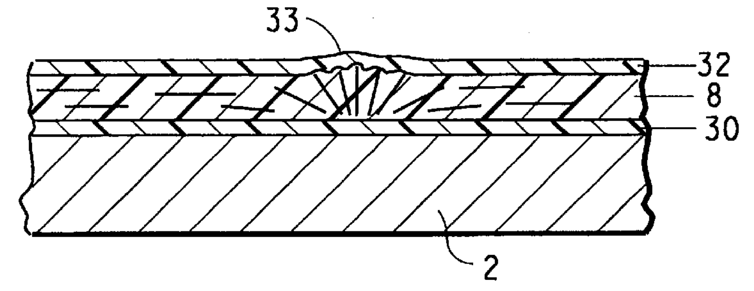
FIG. 5 shows in side elevation and enlarged cross-section a preferred embodiment of the release coating of the present invention.

The baking stabilizes (affixes) the magnetically induced pattern of reoriented flakes within the release coating on the substrate. The substrate can be roughened such as by grit blasting or chemical etching to create cavities to which the release coating can anchor. Preferably, however, the substrate as shown for the frying pan 2 surface in FIG. 4 is smooth. Even when smooth, the magnetically induced pattern of reoriented flakes obtained in accordance with the present invention remains in place during the baking process, whereupon the pattern becomes permanent within the coating. In accordance with the preference for a smooth surfaced substrate, the release coating is preferably adhered to the substrate via an intervening primer layer 30 such as shown in FIG. 5. In another preferred form of the present invention, the release layer or coating is in two parts (layers), the layer 8 which contains the flakes 10, and a topcoat 32 which is free of such flakes. The layer 8 is thereby present as a midcoat. The topcoat 32 contains minute mounds 33 extending from its surface, telegraphing the presence of the mounds 11 from layer 8, but smoothing them out. The presence of the topcoat 32 thus provides a smoother exposed surface for the release coating, and if thick enough can mask the mounds 11 in the underlying layer altogether. The topcoat adds to the aesthetics of the decorative surface by improving the gloss.

Figure 6:
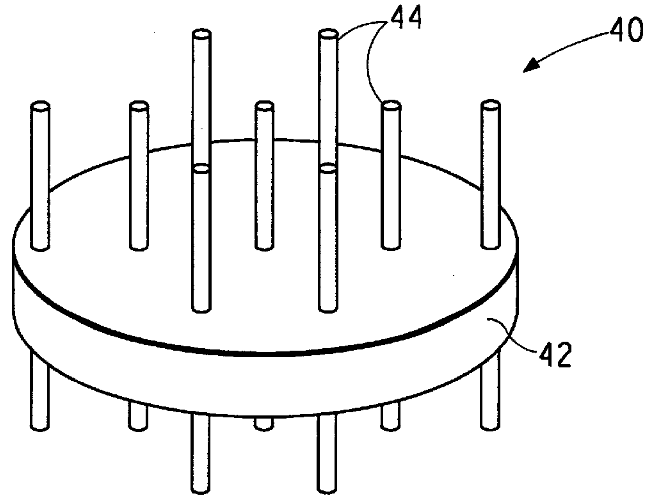
FIG. 6 shows in perspective another embodiment of magnetizable die useful in the present invention.
Figure 7:
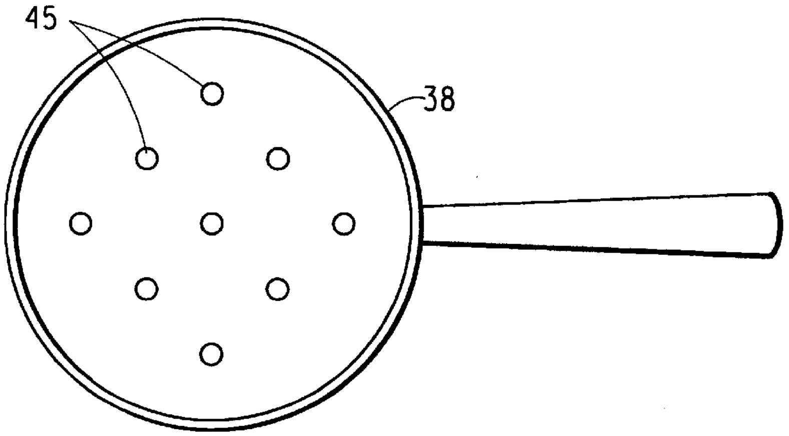
FIG. 7 shows in plan view of the substrate the magnetically induced pattern in the release coating obtainable from the die of FIG. 6.

FIG. 6 shows another embodiment of magnetizable die 40 comprising a wooden plate 42 having holes drilled therein to accommodate magnetizable metal pins 44 which are preferably tightly engaged in their respective holes. This die can be used in place of die 12, with the bottom ends of the pins in contact with the diffuser plate 22 and the top ends in contact with (or adjacent to) the underside of the frying pan 38 as shown in FIG. 7 which is similar to frying pan 2. Each pin, being at an angle to the plane of the underside of the frying pan 38, communicates the magnetic force from the diffuse magnetic field of the plate 22 to the coating to form a pattern visible in reflected light as a plurality of dark points (dots) 45 within a light-appearing coating, with the diameter of the dots in the pattern being slightly larger than the diameter of the rods pins as shown in FIG. 7. The pattern (placement and frequency) of pins can be varied as desired and can be combined with an annular pattern such as that morningstar pattern shown in FIG. 3. The dots formed within the coating can have the optical appearance of depressions lending an impression of optical depth and therefore thickness to the cookware article, while yet retaining a smooth, nonstick surface. For convenience, the structure forming the magnetic die, e.g. the sheet metal forming the die in FIG. 2 or the pins 44, will be positioned perpendicular, i.e. the die itself can be considered as being perpendicular, to this plane of the underside of the substrate bearing the liquid coating composition.

Figure 8:
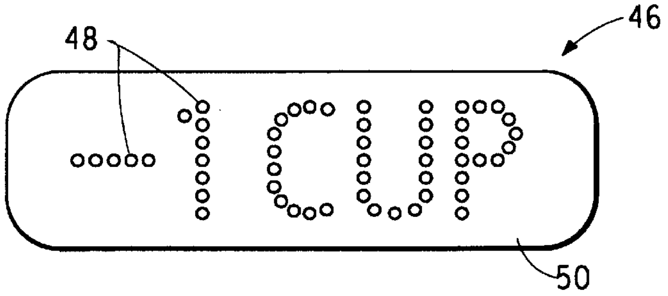
FIG. 8 shows in plan view another embodiment of magnetizable die for forming a magnetically induced pattern in the form of a liquid level marking in a release coating in accordance with the present invention.
Figure 9:
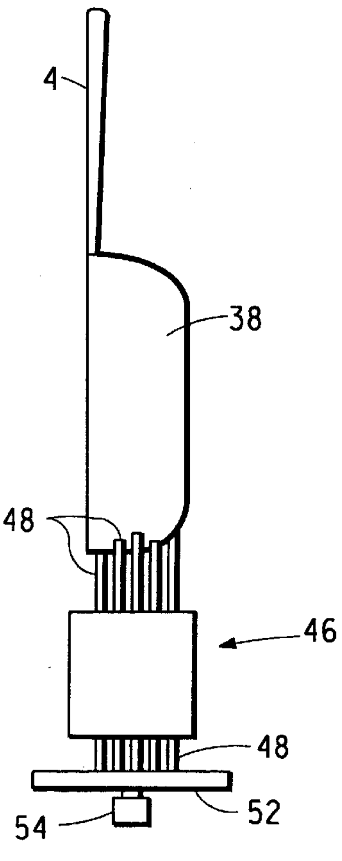
FIG. 9 shows in schematic side elevation one use of the die of FIG. 8 for forming the liquid level marking in the release coating on the sidewall of the frying pan.

FIG. 8 shows in enlarged plan view another embodiment of a magnetizable die 46 based on pins 48. In this embodiment, the pins are of smaller diameter, e.g. 1 mm in diameter as compared to 3 mm in diameter for the pins 44 of FIG. 6. The pins 48 are spaced closely together, e.g. pin heads are in close proximity or touching contact with each other but can be held in place the same way, namely by a wooden plate or foam block, 50, having holes which tightly accommodate the pins 48. As shown in FIG. 8, the pins 48 form information instead of decoration, namely to show a liquid level and label of "1 CUP," for the liquid level. This die can be used to apply this information to the sidewall of the frying pan 38, or other release coated vessel, such as shown in FIG. 9, wherein the die is shown positioning its pins against the sidewall of the frying pan and against diffuser plate 52, beneath which is the magnet 54 which is the source of the magnet force reaching the flakes in the coating composition. The close spacing of the pins 48 creates a pattern of continuous lines in the coating, providing volume information appearing on the frying pan without any indentation being present in the substrate forming the frying pan or without any change in smoothness of the release coating which contains this liquid level indicia. In this embodiment, the pins 48 can be made in different lengths to account for the curvature of the sidewall of the frying pan. This embodiment of die can also be made of sheet metal formed in the pattern of information desired and held in place by a wooden base or foam block. The use of pins, however, as in FIGS. 8 and 9, facilitates the forming of a wide variety of patterns of indicia, such as additional liquid level markings, including letter description thereof, e.g. oz. or ml. The pins used as the magnetic die in the present invention can have any diameter desired depending on the pattern desired, but typically, they will have a diameter of 0.5 mm to 5 mm.

Figure 10:
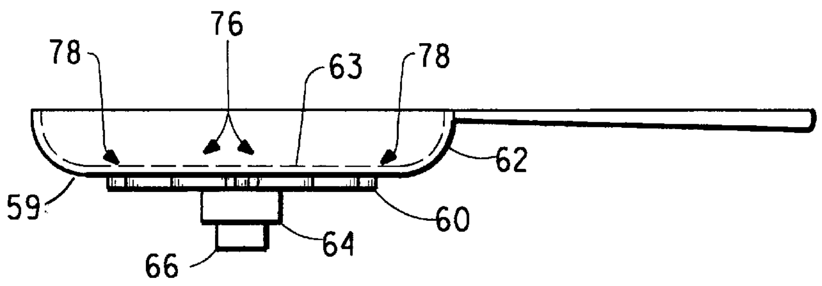
FIG. 10 shows in schematic side elevation an equipment arrangement using a configured plate aligned with the underside of a substrate (frying pan) to form a magnetically induced pattern in a fluoropolymer release coating.
Figure 11:
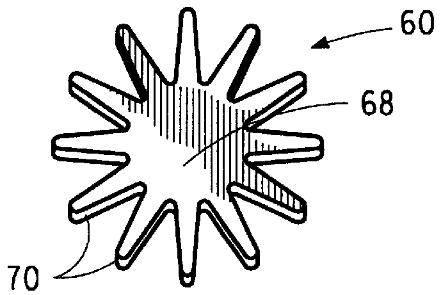
FIG. 11 shows a plan view of the plate used in the equipment arrangement of FIG. 10.
Figure 12:
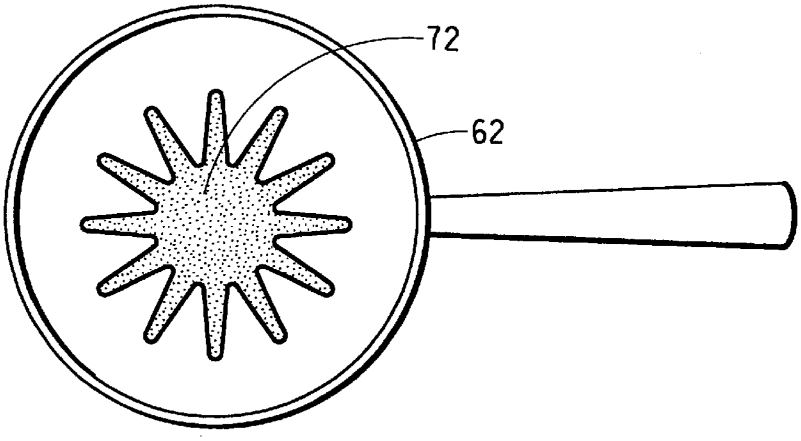
FIG. 12 shows a plan view of the substrate of FIG. 10 with the magnetically induced pattern visible in the release coating on the substrate.
Figure 13:
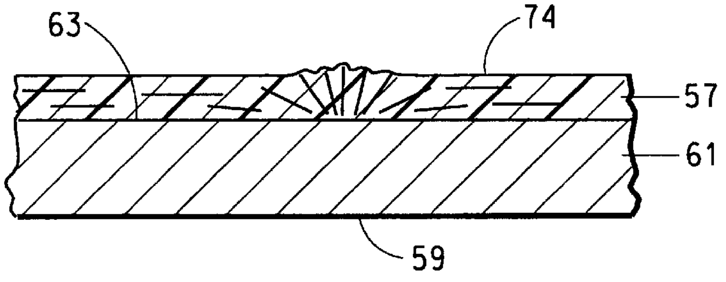
FIG. 13 shows in side elevation and enlarged cross-section a portion of the pattern of FIG. 12 taken generally along the line 13—13.

FIGS. 10–13 show a different embodiment, wherein the magnetically induced pattern in a coating 57 (FIG. 13) is formed using a configured plate, the face of which is oriented in the same direction as an outer surface 59 of a bottom 61 of a frying pan 62, or other cooking vessel, to be coated. In FIG. 10, the configured plate 60 of magnetizable material is positioned in contact with the bottom's outer surface 59 of frying pan 62 which is similar to frying pan 2. Instead of diffuser plate 22 used in FIG. 1, a diffuser block 64 of magnetizable material is used, and a magnet 66 is positioned beneath block 64. The height of block 64 is such that for the strength of the magnet 66 used, sufficient magnetic force reaches the magnetizable flakes in the release coating (while still flowable) to cause the flakes to orient away from the plane of the substrate so as to reproduce the pattern of plate 60. While FIG. 10 shows the bottom outer surface 59 of the frying pan, the plate 60, block 64, and magnet 66 all being in sequential contact with one another, an air gap or non-magnetizable spacer can be introduced between any of the elements forming this equipment arrangement, so as to modulate the magnetic force emanating from the magnet. Such modulation can be used, for example, if it is desired for space reasons to use a diffuser plate like that of FIG. 1 instead of block 64. The area of the face of magnet 66 is smaller than the bottom area of the diffuser block 64, and the magnet is positioned within the bottom area of the diffuser block, so that all of the magnetic force reaching the plate 60 does so by passage through the block 64. FIG. 11 shows the configuration of the edge of plate 60, consisting of a solid center region 68 having tapering arms or segments 70 radially extending therefrom. Preferably the diffuser block, which is in this embodiment an upstanding cylinder because the plate is derived from a circular plate, has an outer diameter which is about the same as the diameter of the region constituting the solid center 68 of the plate 60. The pattern 72 of configured plate 60 is reproduced magnetically in the coating 57 on the inner surface 63 of frying pan 62 as shown in FIG. 12 as a dark region corresponding to the pattern of plate 60 surrounded by a light region, with the dark region appearing to be recessed below the light region, giving the inner surface of the frying pan a three dimensional appearance. Other configurations which depart from a circular pattern from which the plate 60 is derived can be used.

The pattern 72 illustrated in FIG. 12 is a particularly advantageous heat conductive pattern. Because the portion of the flakes in the dark region corresponding to the pattern of plate 60 have been magnetically reoriented in the thickness direction of the coating 57 and have a longest dimension greater than the coating thickness, heat transfer from the inner surface 63 of the bottom 61 of the cooking vessel 62 to an upper surface 74 of the coating is improved (see FIG. 13). Further, because pattern 72 includes tapering arms or segments 70 which extend radially outwardly from a central region 76 (FIG. 10) of inner surface 63 toward an outer peripheral region 78, heat transfer from the center region 76 to the outer region 78 is improved and even distribution of heat on the upper surface 74 may be maintained, even if the cooking vessel 62 is placed on a heating element (e.g., a stovetop burner) having a diameter smaller than the diameter of the cooking vessel bottom 61.

Figure 14:
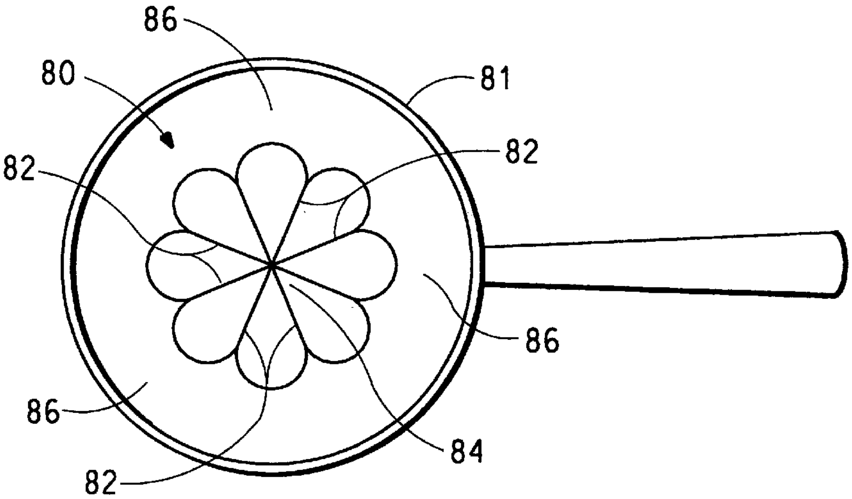
FIG. 14 shows a plan view of a substrate (frying pan) with a heat conductive pattern formed in the release coating on the substrate in accordance with one embodiment of the invention.

Other patterns having the similar heat conductive advantages may also be produced. For example, FIG. 14 illustrates a heat conductive pattern 80 formed in the coating covering the inner surface of the bottom of a cooking vessel 81. The heat conductive pattern 80 includes a plurality of segments 82 which extend outwardly from the center region 84 toward the outer peripheral region 86. The segments 80 are interconnected proximate the outer peripheral region 86 to further improve the heat distribution in region 86. Pattern 80 may be formed using a "cookie cutter" or annular-type die pattern that is similar in construction to the die pattern 12 illustrated in FIG. 2. Or, to further improve heat conductivity, the pattern 80 may be formed from a plate similar in construction to the plate 60 shown in FIG. 11. Such a plate would include both configured edges and cut-outs such that segments 82 may be made wider than would otherwise be possible with an annular-type die pattern.

The heat conductive patterns illustrated in FIGS. 12 and 14 include segments that extend substantially continuously from the center region of the cooking vessel bottom toward the outer peripheral region. In other embodiments of the invention, the heat conductive patterns may include segments that appear discontinuous (e.g., broken lines), or the heat conductive pattern may include both continuous and discontinuous segments, curvilinear segments, segments of non-uniform length, segments comprising alphanumeric characters or decorative features, etc., all of which extend from the center region toward the outer peripheral region and which may add to the vessel's aesthetic appeal without detracting from heat conduction. Further, the heat conductive pattern need not be visible, thus enabling the use of flakes made of a non-light-reflective, heat conductive material. Still further, the arrangement of the flakes to form a heat conductive pattern may be accomplished by methods other than magnetization that serve to orient a first portion of the heat conductive flakes in the plane of the inner surface of the cooking vessel's bottom and a second portion of the heat conductive flakes in the thickness direction of the coating.

Fluoropolymers are useful as components in compositions forming the primer layer, the midcoat or under layer, and the topcoat because of the heat resistance of these materials. Such resins contain at least 35 wt % fluorine. One particularly useful fluoropolymer is polytetrafluoroethylene (PTFE) which provides the highest heat stability among the fluoropolymers. Optionally, the PTFE contains a small amount of comonomer modifier which improves film-forming capability during baking, such as perfluoroolefin, notably hexafluoropropylene (HFP) or perfluoro(alkyl vinyl) ether (PAVE), notably wherein the alkyl group contains 1–5 carbon atoms, with perfluoro(ethyl or propyl vinyl ether) (PEVE and PPVE, respectively) being preferred. The amount of modifier may be insufficient to confer melt-fabricability to the PTFE, generally no more than about 0.5 mole %. The PTFE, can have a single melt viscosity, usually about $1\times10^9$ Pa.s, but, if desired, a mixture comprising PTFE's having different melt viscosities can be used to form the fluoropolymer component.

In one aspect of this invention, the fluoropolymer component, is melt fabricable fluoropolymer, either blended with the PTFE, or in place thereof. Examples of such melt-fabricable fluoropolymers include tetrafluoroethylene (TFE) copolymers with one or more of the comonomers as described above for the modified PTFE but having sufficient comonomer content to reduce the melting point significantly below that of PTFE. Commonly available melt-fabricable TFE copolymers include FEP (TFE/HFP copolymer) and PFA (TFE/PAVE copolymer), notably TFE/PPVE copolymer. The molecular weight of the melt-fabricable tetrafluoroethylene copolymers is sufficient to be film-forming and be able to sustain a molded shape so as to have integrity in the primer application. Typically, the melt viscosity of FEP and PFA will be at least about $1\times10^2$ Pa.s and may range to about $10–400\times10^3$ Pa.s as determined at 372° C. according to ASTM D-1238.

The fluoropolymer component is generally commercially available as a dispersion of the polymer in water, which is the preferred form of the composition for this invention for ease of application and environmental acceptability. By "dispersion" it is meant that the fluoropolymer particles are stably dispersed in an aqueous medium, so that settling of the particles does not occur within the time when the dispersion will be used. The stability of the dispersion can be achieved as the result of the relatively small size of the fluoropolymer particles, typically on the order of 0.2 micrometers, and the use of one or more surfactants in the aqueous dispersion. Such dispersions can be obtained directly by the process known as dispersion polymerization, optionally followed by concentration and/or further addition of surfactant. Examples of suitable surfactants include at least one of octylphenoxytriethoxyethanol, triethanolamine oleate, among others.

The release coating, which in one embodiment may be a midcoat and a topcoat, used in this invention is generally derived from a dispersion of one or more fluoropolymers to which has optionally been added a dispersion of an acrylic polymer. Suitable midcoat and topcoat are described by U.S. Pat. No. 4,180,609 (Vassiliou); U.S. Pat. No. 4,118,537 (Vary & Vassiliou); U.S. Pat. No. 4,123,401 (Berghmans & Vary); U.S. Pat. No. 4,351,882 (Concannon) hereby incorporated by reference.

The composition forming the midcoat and topcoat used in the present invention can contain in addition to the fluoropolymer component, a dispersion of a polymer of monoethylenically unsaturated monomers, such as the acrylic polymer dispersions described in U.S. Pat. No. 4,123,401 (Berghmans and Vary) and U.S. Pat. No. 4,118,537 (Vary and Vasilliou); hereby incorporated by reference. The coating composition typically shows improved coalescence on curing if a polymer of monoethylenically unsaturated monomers have been added to the fluoropolymer component. The polymer of monoethylenically unsaturated monomers can be any suitable polymer or copolymer (in the sense of being composed of two or more types of monomers) of ethylenically unsaturated monomers which depolymerize, and whose depolymerization products vaporize, in the temperature range of about 150° C. below the fusion temperature of the fluoropolymer used to about the fluoropolymer's decomposition temperature and thus vaporizes during the baking step. It may be desirable that the polymer of monoethylenically unsaturated monomers be in solution in a solvent compatible with the rest of the system or be present as a stable dispersion of small particles. For desired results, the average particle size is generally below 1 micrometer.

Illustrative of acrylic polymers which can be used as an additive are polymers of one or more monoethylenically unsaturated monomers which also contain one or more monoethylenically unsaturated acid units. Representative of the monomers are alkyl acrylates and methacrylates having 1–8 carbon atoms in the alkyl group, styrene, alpha-methyl styrene and vinyl toluene. Representative of the acid units are acrylic acid, methacrylic acid, fumaric acid, itaconic acid and maleic acid (or anhydride). Mixtures of these polymers can also be used. The acid units of these polymers can optionally be esterified with glycidal esters of 4–14 carbon atoms. Such a polymer is ordinarily present at a concentration of about 2–300% by weight of the fluoropolymer, and preferably about 5–20%. The preferred polymer additive is an acrylic latex of a methylmethacrylate/ethylacrylate/methacrylic acid 39/57/4 terpolymer.

The release coat, in particular the midcoat used in the present invention, may contain an effective amount of heat conductive flakes to produce a heat conductive pattern in the coating upon localized reorientation of the flakes. The release coating generally contains from 2–6 wt. % of magnetizable flakes, based on the dry weight of the coating composition. Some of these flakes may have a longest dimension which is less than the thickness of the coating, e.g., less than 50 wt. % of the flakes, but this condition may exist because of the flake size distribution in the flakes that are commercially available. The "short" flakes make little contribution to the visibility of the pattern. Particularly useful are light reflecting, magnetizable flakes, such as 316L stainless steel flakes having an average longest dimension of from 20 to 60 micrometers, and normally, the flakes will be a mixture of sizes in which a substantial proportion, preferably at least 40 wt %, has a longest dimension of at least 44 micrometers.

The compositions forming the primer, intermediate and top coatings used in the present invention often contain one or more pigments, normally in a mill base medium that is either soluble in or miscible with the water of the fluoropolymer aqueous dispersion. However, judicious care is needed in selecting the pigment and quantities of pigment for use in the midcoat and topcoat used in this invention in order not to mask the pattern created by magnetic induction. The pigment mill base is normally produced by milling (grinding) pigment in its liquid medium, which deagglomerates the pigment and produces dispersion uniformity. The preferred medium is water which contains an amount of a surfactant sufficient for the mill base to become an aqueous dispersion of the pigment by the milling process. Pigments for use in cookware applications have limitations imposed on their use by the U.S. Food and Drug Administration (FDA) because of food contact. Pigments to be used in this invention must be heat stable and nontoxic. Suitable pigments include at least one member from the group of carbon black, titanium dioxide, iron oxide, and zeolites such as ultramarine blue, and/or cobalt blue, among others.

The compositions forming the topcoat when used in this invention often contain mica particles, and mica particles coated with pigment. Such particles impart scratch resistance to the articles on which they are coated. These particles have an average longest dimension of about 10 to 200 micrometers, preferably 15–50 micrometers, with no more than 50% of the particles of flake having longest dimensions of more than about 500 micrometers. For use in this invention, mica particles coated with pigment having a longest dimension of 1–15 micrometers are preferred. Small particle size mica flakes, whether present in the coating which contains the flakes and/or in the topcoat when used, allow the magnetically induced pattern to be seen without scattering light or showing metallic luster, yet provide reinforcement for the topcoat. The mica particles coated with pigment preferred for this invention are those described in U.S. Pat. No. 3,087,827 (Klenke and Stratton); U.S. Pat. No. 3,087,828 (Linton); and U.S. Pat. No. 3,087,829 (Linton); hereby incorporated by reference. The micas described in these patents are coated with oxides or hydrous oxides of titanium, zirconium, aluminum, zinc, antimony, tin, iron, copper, nickel, cobalt, chromium, or vanadium. Titanium dioxide coated mica is preferred because of its availability. Mixtures of coated micas can also be used. The mica or coated mica is ordinarily present in the topcoat at a concentration of about 0.2–20% by dry weight of the composition.

The primer coating when used in this invention is generally derived from an aqueous dispersion of at least one fluoropolymer and a water soluble or water dispersible film-forming binder material. A suitable primer is described by the U.S. Pat. No. 4,087,394 (Concannon); U.S. Pat. No. 5,240,775 (Tannenbaum) and U.S. Pat. No. 5,562,991 (Tannenbaum); hereby incorporated by reference.

The film-forming binder component that can be used in forming the primer coating is composed of polymer which is thermally stable. This component is well known in primer applications for non-stick finishes, for adhering the fluoropolymer-containing primer layer to substrates and for film-forming within and as part of the primer layer. The binder is generally non-fluorine containing and yet adheres to the fluoropolymer. Preferred binders are those that are soluble or solubilized in water or a mixture of water and organic solvent for the binder, which solvent is miscible with water. This solubility aids in the blending of the binder with the fluorocarbon component in the aqueous dispersion form. An example of the binder component is polyamic acid salt which converts to polayamideimide upon baking of the composition to form the primer layer. This binder is preferred because in the fully imidized form obtained by baking the polyamic acid salt, this binder has a continuous service temperature in excess of about 250° C. The polyamic acid salt is generally available as polyamic acid having an inherent viscosity of at about 0.1 as measured as a 0.5 wt % solution in N,N-dimethylacetamide at about 30° C. It is dissolved in a coalescing agent, such as N-methylpyrrolidone, and a viscosity-reducing agent, such as furfuryl alcohol and reacted with tertiary amine, preferably triethylamine, to form the salt, which is soluble in water, as described in greater detail in U.S. Pat. No. 4,014,834 (Concannon) and U.S. Pat. No. 4,087,394 (Concannon); the disclosure of both is hereby incorporated by reference. The resultant reaction medium containing the polyamic acid salt can then be blended with the fluoropolymer aqueous dispersion, and because the coalescing agent and viscosity-reducing agent are miscible in water, the blending produces a substantially uniform coating composition. The blending can be achieved by simple mixing of the liquids together without using excess agitation so as to avoid coagulation of the fluoropolymer aqueous dispersion. The proportion of fluoropolymer and binder in compositions of the present invention can be in the weight ratios of about 0.5 to 2.5:1. The weight ratios of fluoropolymer to binder disclosed herein are based on the dry weight of these components in the primer layer, which in essence is the same as the relative weight in the primer layer after baking the composition after application as a coating to a substrate. When the composition of the invention is in the preferred aqueous form, these components will constitute about 5 to 50 wt. % of the total dispersion.

An inorganic filler film hardener component may be present in the primer composition. The film hardener is one or more filler type materials which are inert with respect to the other components of the composition and thermally stable at baking temperatures which fuse the fluoropolymer and binder. Preferably the film hardener is water insoluble so that it is uniformly dispersible but not dissolved in an aqueous dispersion. By filler-type material is meant that the filler is finely divided, generally having a particle size of about 1 to 200 micrometers, usually 2 to 20 micrometers, which is usually obtained by the film hardener component and which imparts durability to the primer layer by resisting penetration of sharp objects that may penetrate the fluoropolymer overcoat.

Examples of the film hardener include one or more metal silicate compounds such as aluminum silicate and metal oxides, such as, titanium dioxide and aluminum oxide. Examples of such film hardeners are described in U.S. Pat. No. 5,562,991 (Tannenbaum) and U.S. Pat. No. 5,250,356 (Batzar); the disclosure of which is hereby incorporated by reference.

The primer composition used in the present invention in aqueous dispersion form may also contain such other additives as adhesion promoters, such as colloidal silica or a phosphate compound, such as a metal phosphate, e.g., Zn, Mn, or Fe phosphate.

The coatings used in the present invention, whether single coating containing the magnetizable flakes, or multiple coatings, such as primer, midcoat (containing the flakes) and topcoat, can be applied to substrates by a variety of techniques and to a variety of substrates. Roller, dip, and spray coating can be utilized. It is only necessary that the coating composition which contains the thermally conductive flakes be applied as a liquid composition so that the flakes can be reoriented to form the heat conductive pattern. The layer containing the flakes will be thinner than the longest dimension of the flakes and will generally be 5–40 micrometers thick, preferably 5–30 micrometers thick, more preferably 5–25 micrometers thick (0.2–1 mil). When the release coating is a combination of midcoat (containing the flakes) or undercoat and topcoat, the combined thickness will generally be 5–50 micrometers thick, preferably 5–40 micrometers thick. Preferably, the flake-containing layer will be the thicker layer, constituting 60 to 90% of the total thickness of the two layers, and more preferably 70 to 85% so as to be efficient in transferring heat through the entire thickness of all the layers coated onto the substrate. The heat conductive flakes are chosen to have a longest dimension which is greater than the thickness of the flake-containing layer, and more often, thicker than the total thickness of the flake-containing layer and the topcoat, if present. The primer layer, if used, will generally have a thickness of 0.5 to 10 micrometers, more often 5 to 10 micrometers (0.2–0.4 mils). The topcoat, if used, will generally have a thickness of 2.5 to 10 micrometers. More often, the primer layer will be 6 to 8 micrometers thick, the topcoat will be 4 to 6 micrometers thick, and the flake-containing midcoat will be 17 to 25 micrometers thick. The layer thicknesses disclosed herein refer to the dry film thickness (DFT).

The substrates can be any non-magnetizable material which can withstand the relatively high bake temperatures used to fuse the coatings. Such substrate materials include metals and ceramics, such as aluminum, anodized aluminum, stainless steel, enamel, glass, pyroceram, among others. The substrate can be gritblasted (roughened) or smooth, and cleaned prior to coating. For pyroceram and some glass, improved results are obtained by activation of the substrate surface such as by slight, chemical etch, which is not visible to the naked eye. The substrate can also be chemically treated with an adhesion agent such as the mist coat of polyamic acid salt disclosed in U.S. Pat. No. 5,079,073 (Tannenbaum); hereby incorporated by reference.

The compositions described above are particularly used to provide an article of cookware, having a cooking surface which comprises a multi-layer, non-stick coating on a substrate which coating minimizes sticking by food residues and which is heat resisting by being stable above about 300° C. The present invention provides for a coated substrate having a magnetically induced image pattern and preferably having an average surface roughness, (abbreviated Ra), less than 1.5 micrometers, as determined using a Hommel Profilometer, model T-500. Typically, the surface roughness will be at least 0.5 micrometers. The substrate itself preferably has the same smoothness, preferably less than 1.5 micrometers and more preferably less than 1.25 micrometers. The coated substrate of the present invention may be in the form of numerous articles of cookware such as fry pans, pots, bakeware, casseroles and the like, which may have shapes other than circular, such as square, rectangular, oval, etc. Although items of cookware are herein illustrated, numerous other household or industrial applications of this technology are contemplated. By example, the sole plate of an iron may be provided with a magnetically induced pattern. Processing tanks or vats having a release finish may benefit from liquid level marking or the like. Further, industrial coaters may choose to apply identification markings or a logo to release coated surfaces by the disclosed magnetic inducing techniques.

EXAMPLE 1

A pattern is magnetically induced in a release coating on an aluminum substrate which has the form of a frying pan. The setup for applying the coating is similar to that illustrated in FIG. 1.

Aluminum frying pan 2 has a diameter of 25.4 cm and is typically 1.5–3.2 mm thick. The frying pan is positioned over a magnetizable die 12 which is akin to a mold or "cookie cutter" being formed from magnetizable sheet metal into a morningstar pattern as shown in FIG. 2. The die is formed from 1010 steel alloy sheet of 1.6 mm thickness. The die has a pattern of an 8 pointed star having an apparent diameter of 22.9 cm with edges that are 10 cm high.

The magnetizable die 12 is positioned over a diffuser plate 22 which rests on a platform 9 (not shown). The plate is a carbon steel plate having the dimensions of 30.5×30.5×0.65 cm. Positioned between the diffuser plate 22 and the magnetizable die 22 are two nonmagnetizable spacer sheets (not shown) of aluminum having the dimensions 30.5×30.5×1.3 cm. The platform is positioned over magnet 16 and provides a shield between diffuser plate 22 and magnet 16 and prevents plate 22 from adhering to the magnet. Magnet 16 is a permanent magnet of Neodimium-Iron-Boron Alloy of 10 cm diameter with a capability of generating 2 tesla (20,000 gauss) manufactured by Dexter Magnetics of Sunnyvale, Calif. 94086. Diffuser plate 22 absorbs upwardly emanating magnetic fields and drives the fields horizontally creating a larger workable magnetic area equal to the breadth of the diffuser plate, but of weakened magnetic force.

The additional nonmagnetizable aluminum spacer sheets further dampen the strength of the magnetic field acting on magnetizable flakes 10' in release coating 8 as the coating is applied to fry pan 2. The distance between magnet 16 and magnetizable die 12 as illustrated in FIG. 1 may be adjusted to deliver the magnetic force of desired strength through the edges of die 12. The magnetic force as measured at the tip of the magnetic die in contact with the fry pan is 128 gauss. It has been found that by reducing the strength of the magnetic field and eliminating or decreasing certain lines of force, that magnetic background effects are reduced. This results in a decorative surface on the substrate that is smooth.

A primer having the composition of Table 1 is sprayed on a clean, lightly etched aluminum frying pan having a surface smoothness of 1.25 micrometers to dry film thickness (DFT) of 15 micrometers. The primer was dried at 66° C. for 5 minutes. A midcoat with magnetizable flakes having the composition of Table 2 is sprayed onto the frying pan to a DFT (dry film thickness) of 13 micrometers as magnetic force was applied through the magnetizable die in accordance with the present invention, causing a portion of the flakes to magnetically reorient into the pattern of the edges of the die. A topcoat having the composition of Table 3 is sprayed over the midcoat to a DFT of 13 micrometers while the midcoat is still wet also in the presence of magnetic force. The entire system is baked at 427° C. to 435° C. for 5 minutes. The frying pan has a decorative surface with a magnetically induced pattern and an average surface roughness, (Ra) less than 1.5 micrometers, as determined using a Hommel Profilometer, model T-500.

In all of the following Tables: "solvent-surfactant blend" corresponded to approximately 19.5% butyl carbitol, 23.9% mixed aromatic hydrocarbons, 4.7% cerium octoate, 37% triethanolamine, 8% lauryl sulfate, and the balance was water; and "acrylic dispersion" corresponded to approximately 39/57/4 methyl methacrylate/ethyl acrylate/methacrylic acid. The polymer comprised about 40% of the dispersion, 9% triethanolamine, 8% sodium lauryl sulfate, and the balance was water.

TABLE 1

| Primer | Coating Composition (Wt. %) | Solids Content in Finished Article (Wt. %) |
|---|---|---|
| Furfuryl Alcohol | 1.85 | — |
| Polyamic acid salt in N-Methyl Pyrrolidone | 18.3 | 30.39 |
| Deionized Water | 48.8 | — |
| Mica | 0.050 | 0.03 |
| PTFE Dispersion | 8.04 | 27.38 |
| FEP Dispersion | 5.95 | 18.1O |
| Colloidal Silica Dispersion | 3.64 | 6.01 |
| Carbon black dispersion | 8.09 | 13.43 |
| Aluminum silicate dispersion | 5.25 | 4.64 |

TABLE 2

| Intermediate | Coating Composition (Wt. %) | Solids Content in Finished Article (Wt. %) |
|---|---|---|
| PTFE Dispersion | 58.5 | 81.0 |
| PFA Dispersion | 10.6 | 14.7 |
| Deionized Water | 3.2 | — |
| 316L SS Flake* | 1.9 | 4.3 |
| Solvent-Surfactant blend | 13.1 | — |
| Acrylic polymer dispersion | 12.7 | |

*SS Fine water grade, −325 mesh with a D-50 = 25 microns (more than 50% of the particles have a longest dimension of at least 25 microns) produced by Novamet Specialty Products of Wyckoff, N.J.

TABLE 3

| Topcoat | Coating Composition (Wt. %) | Solids Content in Finished Article (Wt. %) |
|---|---|---|
| PTFE Dispersion | 66.95 | 94.55 |
| PFA Dispersion | 3.51 | 4.96 |
| Deionized Water | 3.77 | — |
| Mica (1–15 microns) | 0.21 | 0.49 |
| Solvent-Surfactant Blend | 12.51 | — |
| Acrylic polymer dispersion | 13.04 | — |

EXAMPLE 2

A pattern is magnetically induced in a release coating on an aluminum substrate which has the form of the sidewall of a frying pan. The setup for applying the coating is similar to that illustrated in FIG. 9.

Aluminum fry pan 38 has a diameter of 25.4 cm and is typically 1.5–3.2 mm thick. The fry pan is positioned over a magnetizable die 46 based on pins 48 wherein the die is positioned against the sidewall of the fry pan and against diffuser plate 52 beneath which is placed magnet 54, as shown in FIG. 8. The die is formed from a plurality of straight pins of steel alloy having a 1 mm diameter head and a length of 3 cm. The pins are spaced closely together, e.g. pin heads are in touching contact with each other and are held in place by a foam block 50 of polystyrene of 1.95 cm thickness which tightly accommodates the pins. The pin heads are positioned flush to one surface of the foam block and in contact with the fry pan. The pin ends protrude through the opposite surface of the foam block and are in contact with the diffuser plate. The die is a pattern of liquid level marking "1 CUP".

The platform, diffuser plate and magnet are the same as those specified in Example 1. No spacer plates are present. Preparation of the frying pan, compositions of primer, midcoat, and topcoat, and method of application are the same as those specified for Example 1.

The close spacing of the pins 48 creates a pattern of continuous lines in the coating, providing liquid level markings appearing on the frying pan without any indentation being present in the substrate forming the frying pan or without any change in smoothness of the release coating which contains this liquid level indicia.

EXAMPLE 3

Similar to example 1, two aluminum frying pans, but of differing thicknesses, are coated with a magnetically induced pattern. One frying pan is 8 gauge, e.g., 3.2 mm, the other pan is 6 gauge, e.g., 4.1 mm. Using fry pans of different thicknesses illustrates the differences of varying the spatial gap between the tip of die and the magnetizable flake in the release coating. The die for this Example 3 is formed by positioning sheets from 1010 steel alloy of 1.6 mm thickness×10 cm×6.9 cm in alternating arrangement with sheets of 1.6 mm×10cm×5.7 cm inches in tightly fitting slots of a foam block to form 12 radiating edges that form a pattern of radiating lines (similar to the line representation of a sun) with an apparent diameter of 17.8 cm. The edges of one side of the die are positioned against the frying pan bottom with opposite edges of the die positioned against the diffuser plate. The spatial gap between the tips of the die and the magnetizable flakes differ by the thickness of the two frying pans.

The platform, diffuser plate and magnet are the same as those specified in Example 1. No aluminum spacer plates are present. Preparation of the frying pan, compositions of primer, midcoat, and topcoat, and method of application are the same as those specified for Example 1. The magnetic force as measured at the tip of the magnetic die in contact with the frying pan is 300 gauss.

Radiating line patterns are visible in both frying pans. However, the pattern as determined by visual inspection, in the thicker (6 gauge) pan is somewhat weak, yet has lines of greater clarity (less fuzzy) due to the increased spatial gap. The pattern created in the thinner (8 gauge) pan is strong but the lines are fuzzy. To correct the pattern in the thicker pan, a larger (stronger) magnet which can produce a stronger magnetic force communicated to the coating by the magnetic die is used. To correct the pattern in the thinner pan, spacer plates are used to modulate the magnetic force delivered to the die.

EXAMPLE 4 (Comparative)

Similar to Example 1, an aluminum frying pan, is coated with a magnetically induced pattern but instead of the set up as described in FIG. 1 herein, a pole piece in the form a of a shaped plate of magnetizable steel (8 mm thick) having the same morningstar pattern is placed directly on (laid across) the magnet. The shaped plate is in contact with the underside of the frying pan. The pole piece is a flat plate with no hollow interior, and serves as a template akin to a "dress pattern" used for sewing. The magnetic force is directed through the bulk area of magnetic template acting on the magnetizable flakes of the release coating. The magnetic force is sufficient to cause orientation of the flakes but not excessive to obliterate the resultant pattern. Nevertheless, directing magnetic force the bulk area produces unwanted field lines which result in a fuzzy outline to the solid magnetic imprint and a roughened decorative surface on nonmagnetic base 1. The roughened surface is unsuitable in that food particles tend to stick. Further the surface is more susceptible to gouging because of flake has oriented on an angle and is more likely to respond to be pulled from the coating.

The magnet used is 0.6 tesla (600 gauss), permanent magnet. No platform, diffuser plate or spacer plate is present. Preparation of the frying pan, compositions of primer, midcoat, and topcoat, method of application and thickness of coatings are the same as those specified for Example 1. The magnetic force of the die in contact with the frying pan measured as follows: at the point of the star, 300 gauss; at the edge of the star, 180 gauss; at the interior of the pattern, 120 gauss.

The frying pan has a decorative surface with a magnetically induced pattern and an average surface roughness, (Ra), of between 1.5–3.0 micrometers.

EXAMPLE 5

In this Example, the equipment arrangement shown in FIGS. 10–12 is used, using a frying pan similar to that used in Example 1 having a smooth interior surface. The magnetizable die is the configured plate of FIG. 11 having a diameter of 22.9 cm from tip to tip of the extending arms and 0.94 cm thick. The diffuser block 64 is made of mild steel (alloy 1010) and is 6.35 cm in diameter and 7.6 cm high. The magnet is a stacked pair of rare earth permanent magnets, each being Neo-37® magnet obtained from Dexter Magnetics and providing a magnetic force of 3 tesla (30000 gauss). Each magnet It is 5.59 cm in diameter and 0.78 cm thick, and the stack of the two magnets is about 1.5 cm thick. Primer, midcoat and topcoat are applied to the cooking surface of the frying pan, in a similar manner as disclosed in Example 1, except that the primer layer is 7.5 micrometers thick, the midcoat layer is 18 micrometers thick and the topcoat is 5 micrometers thick, the thicknesses being controlled by the spray time used to apply the coatings. As in Example 1, the midcoat, which contains the magnetizable flakes is applied to the dry primer layer while being subjected to the magnetic force using the equipment arrangement just described. The three-coat system applied to the frying pan is baked as in Example 1 to obtain the pattern shown in FIG. 12 wherein the dark appearing pattern in the release coating is set in a surrounding area of light-color, the dark-appearing pattern appearing to be recessed below the plane of the light color area, to give the cooking surface of the frying pan a three-dimensional appearance. The primer and topcoat compositions are similar to the corresponding compositions used in Example 1, and the midcoat composition was an aqueous dispersion having the following composition:

A mixture containing mixed aromatic hydrocarbons, cerium octoate, triethanolamine, oleic acid, Triton® X-100 surfactant in proportions to provide the composition in the following table is added to the blend of acrylic polymer dispersion and fluoropolymer dispersion. The stainless steel flakes, Cab-O-Sil® fumed silica, ethylene glycol, polyamic acid salt, sulfonate surfactant, Triton® X-100 surfactant, and furfural alcohol in proportions to provide the composition in the following table are milled together for addition to the blend of other components. The acrylic polymer dispersion corresponds to approximately to 39/57/4 (wt. ratio) methyl methacrylate/ethyl acrylate/methacrylic acid. The polymer comprises about 40% of the dispersion, 9% triethanolamine, 8% sodium lauryl sulfate, and the balance to total 100 wt % is water.

| Component | Wet Composition (Wt. %) | Solids Content Coating in Finished Article (Wt. %) |
|---|---|---|
| PTFE Dispersion | 57.15 | 80.3 |
| PFA Dispersion | 10.34 | 14.7 |
| Deionized Water | 4.96 | — |
| 316L SS Flake* | 1.8 | 4.3 |
| Solvent-Surfactant blend | 10.67 | — |
| Acrylic polymer dispersion | 12.7 | — |
| Polyamic acid salt in N-methyl pyrrolidone | 0.20 | 0.5 |
| Cab-O-Sil ® fumed silica | 0.17 | 0.4 |
| sulfonate surfactant | 0.04 | — |
| Triton ® X-100 surfactant | 0.68 | — |
| ethylene glycol | 0.04 | — |
| furfural alcohol | 0.02 | — |
| cerium octoate | 0.60 | — |
| Diethyleneglycolmonobutylether | 2.51 | — |
| Triethanolamine | 4.75 | — |
| 1,2,4-trimethylebenzene | 1.01 | — |
| Cumene | 0.06 | — |
| Xylene | 0.06 | — |
| aromatic hydrocarbon | 1.93 | — |

*SS Fine water grade, -325 mesh with a D-50 = 25 micrometers (more than 50% of the particles have a longest dimension of at least 25 micrometers) produced by Novamet Specialty Products of Wyckoff, N.J.

Notes: The polyamic acid salt converts to polyamideimide upon baking. The wet composition contains 36% by weight of water, based on the total wet composition, the water coming primarily from the aqueous dispersion form of the PTFE and PFA. The overall water content of the total composition is 36% primarily supplied by the aqueous media from the polymer aqueous dispersions.

The polyamic acid salt in the composition provides the benefit of being compatible with both the SS flakes and the fluoropolymer components in the composition so that when the flakes reorient under the influence of magnetic force, the portions of the flakes which protrude above the flat surface of the midcoat will be enveloped by fluoropolymer, so that the reorientation does not produce minute fissures (visible under 20× magnification) in the midcoat during reorientation, i.e. tilting of the magnetically affected flakes from the horizontal towards the perpendicular may leave empty space being in the midcoat. Although the midcoat is covered by a topcoat, minute fissures in the midcoat provide easy pathways for moisture to permeate through all the layers to reach the substrate (frying pan) and cause blistering of the coatings. Upon baking, the polyamic acid salt coverts to polyamideimide and bonds the flakes to the fluoropolymer. The midcoat obtained in this Example is free of minute fissures.

The surface of the baked coating on the frying pan is smooth to the touch, having a smoothness of about 0.8 micrometers in the light-colored area and about 1.3 micrometers in the pattern (dark color) area.

The importance of having the block 64 present to diffuse the magnetic force is indicated by reproducing this Example, but eliminating the block, whereby the magnet 66 is positioned in direct contact with the underside of plate 60. The resultant image is less sharp, and the surface of the baked coating (primer/midcoat/topcoat) is rougher, namely 1.75 to 2.5 micrometers in the pattern area), which compromises the release property of the coating.

EXAMPLE 6

In this Example, a fry pan similar to that of Example 5 and having a heat conductive pattern similar to that illustrated in FIG. 12 is placed on a heating element set at medium heat for 2 minutes 45 seconds. An infrared thermogram, measured using an infrared scanner (type THV470 SW) reveals that the heat conductive pattern substantially evenly distributes heat from the central region of the pan's cooking surface to the outer peripheral regions. The temperature gradient from the central region of the cooking surface toward the outer peripheral region ranges from approximately 180° F. (82° C.) in the central region to 155° F. (68° C.) in the outer regions proximate the ends of the tapering arms of the heat conductive pattern. The cooking surface temperature in the extreme outer regions where the heat conductive pattern is not present is in the range of 140° F. (60° C.) to 150° F. (66° C.). The fry pan of this Example evidences more even heat distribution from the center region to the outer peripheral regions than a control pan having no heat conductive pattern that is subject to the same heat conditions. An infrared thermogram of the control pan shows that heat at the cooking surface is concentrated more in the central region [155° F. (68° C.) to 180° F. (82° C.)], and that a greater portion of the outer peripheral region of the control pan is at the lower temperature [140° F. (60° C.) to 150° F. (66° C.)] as compared to the fry pan with the heat conductive pattern.

What is claimed is:

1. A cooking vessel, comprising:

a bottom having an inner surface, the inner surface having a central region and an outer peripheral region; and a coating disposed on the bottom and having a thickness, the coating including flakes made of a thermally conductive material and having a longest dimension which is greater than the thickness of the coating, the flakes including a first portion of the flakes oriented substantially in the plane of the inner surface and a second portion of the flakes oriented substantially in the thickness direction of the coating to form a heat conductive pattern, the heat conductive pattern extending outwardly from the central region toward the outer peripheral region.

2. The cooking vessel as recited in claim 1, wherein the thermally conductive material is magnetizable.

3. The cooking vessel as recited in claim 2, wherein the second portion of the flakes is oriented by a diffuse magnetic field.

4. The cooking vessel as recited in claim 1, wherein the coating is a fluoropolymer release coating.

5. The cooking vessel as recited in claim 1, wherein the thickness of the coating is 5 to 40 micrometers and the longest dimension of the flakes is 44 micrometers.

6. The cooking vessel as recited in claim 5, wherein the flakes include flakes having a longest dimension of less than 44 micrometers.

7. The cooking vessel as recited in claim 1, wherein the heat conductive pattern is visible in reflected light.

8. The cooking vessel as recited in claim 1, wherein the heat conductive pattern includes a plurality of segments.

9. The cooking vessel as recited in claim 8, wherein each of the plurality of segments extends continuously from the central region to the outer peripheral region.

10. The cooking vessel as recited in claim 8, wherein the plurality of segments are interconnected proximate the outer peripheral region.

11. cooking vessel for heating by a heating element, comprising:

a bottom having an inner surface and a bottom surface, the bottom surface adapted to be heated by the heating element; and a fluoropolymer release coating disposed on the inner surface and having an upper surface with a central region and an outer peripheral region, the fluoropolymer release coating including magnetizable flakes having a longest diameter which is greater than the thickness of the fluoropolymer release coating, a first portion of the flakes being oriented substantially in the plane of the inner surface and a second portion of the flakes being magnetically reoriented in the thickness direction of the coating, the flakes being arranged to form a heat conductive pattern such that heat is transferred from the inner surface to the upper surface and from the central region toward the outer peripheral region when the outer surface of the bottom is heated by the heating element.

12. The cooking vessel as recited in claim 11, wherein the heat conductive pattern is observable in reflected light.

13. The cooking vessel as recited in claim 11, wherein the heat conductive pattern includes a plurality of segments.

14. The cooking vessel as recited in claim 13, wherein each of the plurality of segments extends continuously from the central region to the outer peripheral region.

15. The cooking vessel as recited in claim 13, wherein the plurality of segments are interconnected proximate the outer peripheral region.

16. The cooking vessel as recited in claim 11, wherein the second portion of the flakes is magnetically reoriented by a diffuse magnetic field.

* * * * *

UNITED STATES PATENT AND TRADEMARK OFFICE
CERTIFICATE OF CORRECTION

PATENT NO : 6,114,028
DATED : September 5, 2000
INVENTOR(S) : Muchin et al.

It is certified that error appears in the above-identified patent and that said Letters Patent is hereby corrected as shown below:

Claim 11, line 1, before "cooking" insert --A--.

Signed and Sealed this

Twenty-fourth Day of April, 2001

*Attest:*

Nicholas P. Godici

NICHOLAS P. GODICI

*Attesting Officer*

*Acting Director of the United States Patent and Trademark Office*